C. A. CADWELL.
METHOD OF AND APPARATUS FOR WELDING.
APPLICATION FILED JUNE 19, 1915.
1,300,117.
Patented Apr. 8, 1919.
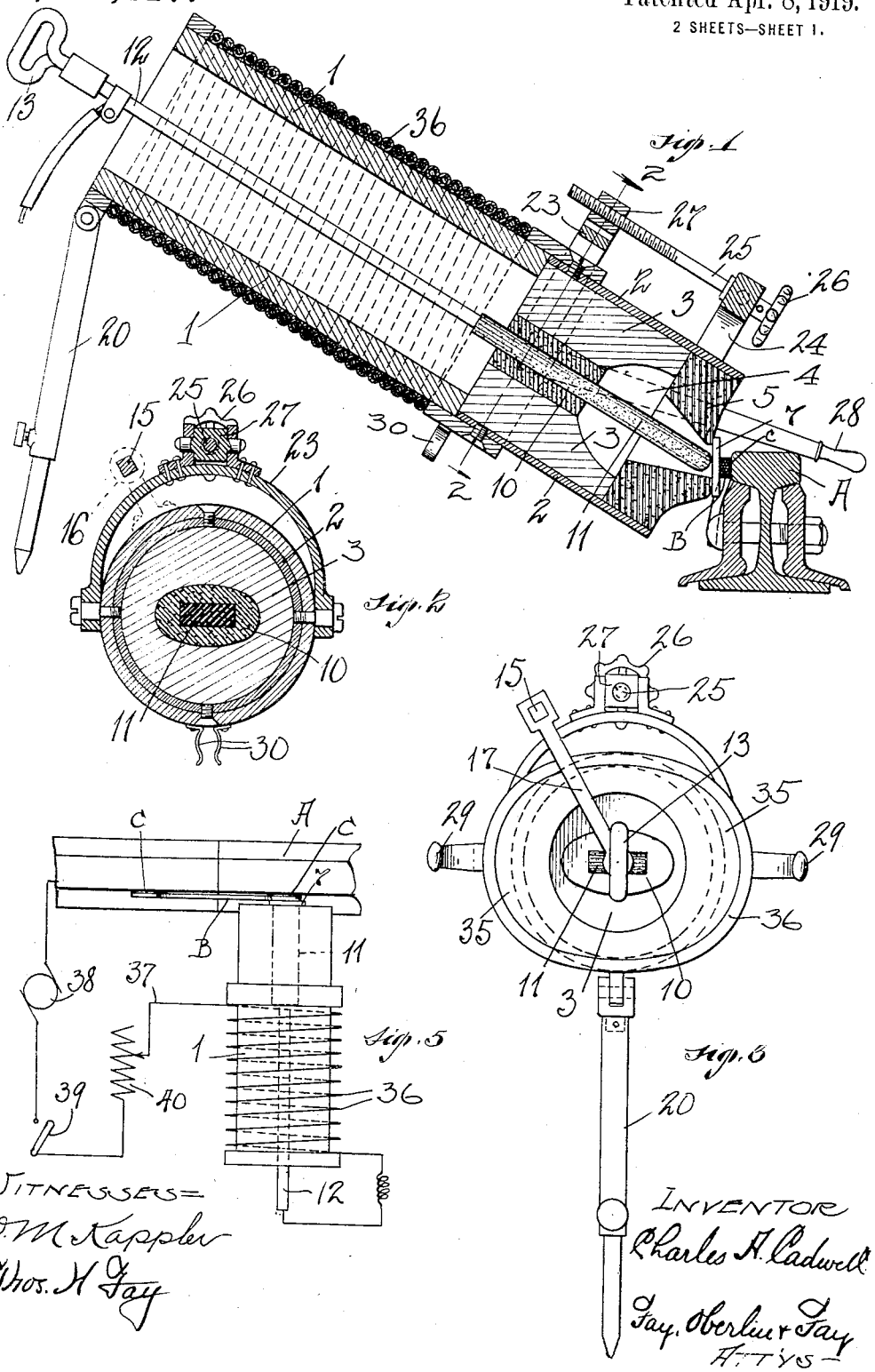

C. A. CADWELL.
METHOD OF AND APPARATUS FOR WELDING.
APPLICATION FILED JUNE 19, 1915.
1,300,117.
Patented Apr. 8, 1919.
2 SHEETS—SHEET 2.
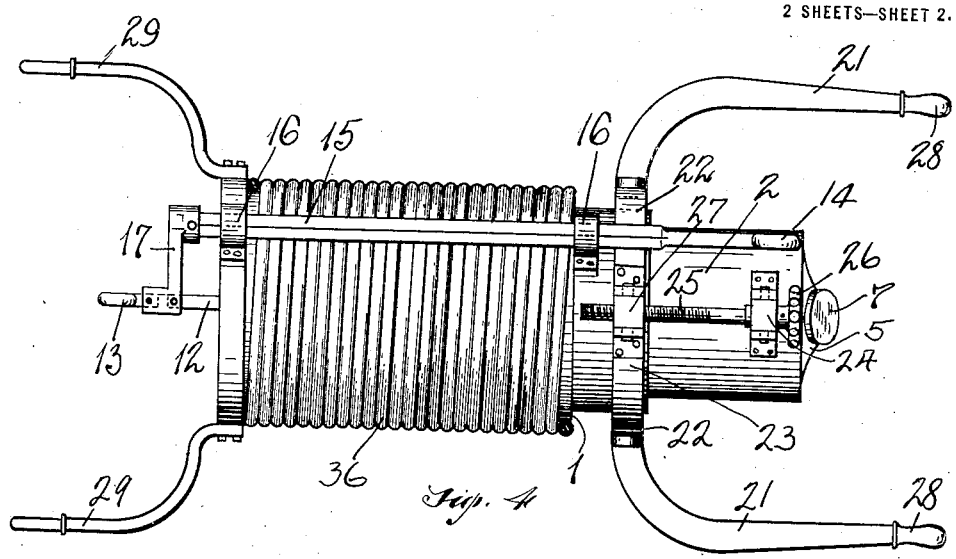
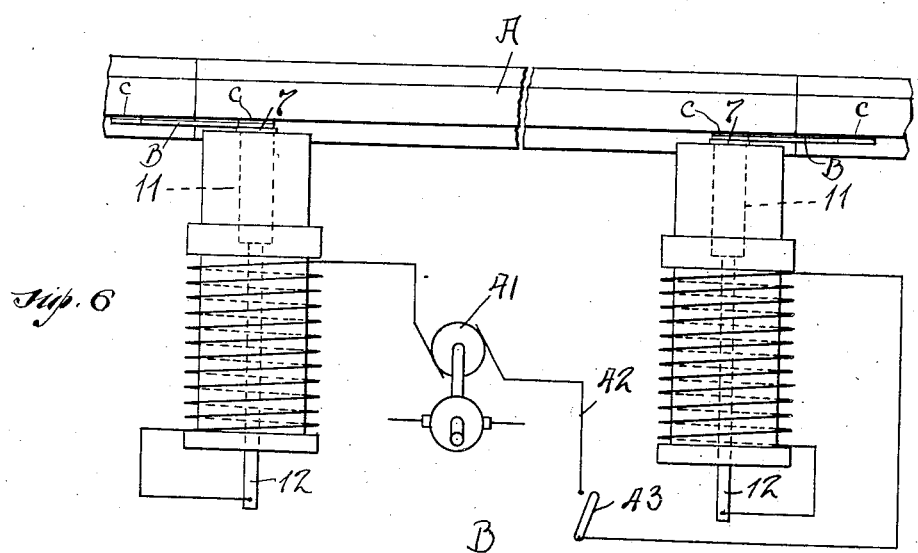
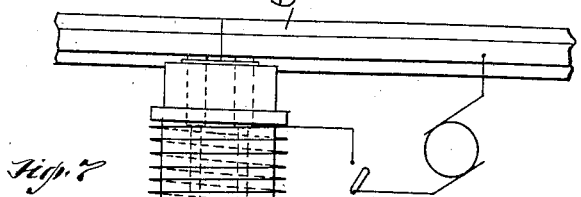
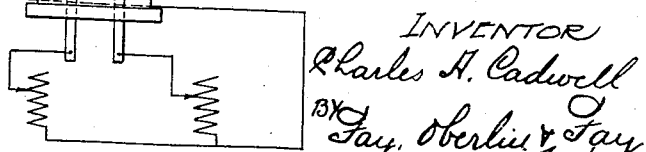

UNITED STATES PATENT OFFICE.

CHARLES A. CADWELL, OF CLEVELAND, OHIO, ASSIGNOR TO THE ELECTRIC RAILWAY IMPROVEMENT COMPANY, OF CLEVELAND, OHIO, A CORPORATION OF OHIO.

METHOD OF AND APPARATUS FOR WELDING.

1,300,117.      Specification of Letters Patent.      Patented Apr. 8, 1919.

Application filed June 19, 1915. Serial No. 35,081.

*To all whom it may concern:*

Be it known that I, CHARLES A. CADWELL, a citizen of the United States, and a resident of Cleveland, county of Cuyahoga, and State of Ohio, have invented a new and useful Improvement in Methods of and Apparatus for Welding, of which the following is a specification, the principle of the invention being herein explained and the best mode in which I have contemplated applying that principle, so as to distinguish it from other inventions.

The present method and apparatus, relating as indicated to welding, have regard more especially to the welding or brazing together of metal parts or bodies, where such bodies are of unlike mass, and where in addition there may be a disparity in the temperatures of fusion, the smaller mass for example having both the lower temperature of fusion and the greater conductivity. Thus, such method and apparatus are especially adapted for the welding or brazing of a metal like copper to steel and may be used for the welding of bonds onto rails and in similar situations, it being understood that neither the method nor apparatus is necessarily limited to such particular application, or field of use.

The homogeneous union of metals having different points of fusion, such as copper and steel, has always presented serious difficulties which are further complicated when the mass of copper is small with respect to the mass of steel to which it is to be united.

It will be apparent from the following description that other sources of heat than electricity may be employed to carry out my improved method, although the specific apparatus illustrated is intended for use with electricity and more particularly with the electric arc as the heating medium, the apparatus, (and the specific method which it is to carry out) for the employment of gas and oil as the source of heat being reserved for separate applications to be filed hereafter.

One principal object of the present invention is the provision of an apparatus whereby current of relatively high voltage may be utilized, so that, for example in bonding rails, current of the voltage regularly used in the operation of the railway may be taken directly from the trolley with the use of a slight resistance. Heretofore, in an operation of this sort, it has been found necessary to utilize an electrode of high-resistance material, bringing the same to the proper high temperature by passing therethrough a current of relatively very low voltage and large amperage. By the present process, however, instead of relying upon the resistance of such an electrode, I use an electric arc, which as is well understood, will take a considerably higher voltage than that just indicated for such resistance electrode.

The use of a flame or arc has heretofore been confined to operations in which an additional metal has been melted thereby and used to fill in between the articles to be united or where an article is built up by molten metal deposited in this manner. So far as I am aware, the flame or arc has not been successfully applied to the welding of articles placed in contact by direct application to one of the articles; since, by reason of the intense and concentrated character of the arc's heating effect, and the body forming one of the poles of the arc, as for example the bond in the illustrative case above referred to, would be fused in spots, without the rest of the terminal being brought to a welding temperature, much less without bringing the juxtaposed face of the rail to anything like the temperature requisite for welding or brazing such bond terminal thereto.

A further object, accordingly, of the present invention is to provide means for controlling and directing a heating electric arc and distributing its heating effect in such fashion as to prevent to a considerable extent the harmful localization of its heating effect and secure substantially the same results as can be obtained from a high resistance electrode of the kind hereinbefore referred to. To the accomplishment of the foregoing and related ends, said invention, then, consists of the means and steps hereinafter fully described and particularly pointed out in the claims.

The annexed drawings and the following description set forth in detail certain mechanism and steps embodying the invention, such disclosed means constituting, however, but several of the various ways in which the principle of the invention may be used.

In said annexed drawings:—

Figure 1 is a central longitudinal section of an approved form of apparatus adapted for the carrying out of my present method; Fig. 2 is a transverse section of such apparatus taken on the plane indicated by the line 2—2, Fig. 1; Fig. 3 is a rear elevational view of the same viewed from the left in Fig. 1; Fig. 4 is a plan view of such apparatus; Fig. 5 is a diagrammatic illustration of such apparatus showing the circuit connections therefor; Fig. 6 is a similar diagrammatic illustration showing two apparatuses connected together for conjoint or simultaneous operation; while Fig. 7 diagrammatically represents a modification in construction.

Referring, first of all, to the construction of the apparatus proper, as illustrated more especially in Figs. 1 to 4 inclusive, it should be explained that such apparatus is designed to be readily portable, being arranged to be carried by not more than two men, so that it may not only be readily taken from one place to another without requiring a special vehicle or car, but also, so that it may be quickly moved out of the way of a car or train on the railway, in the case of a bonding operation, and thus avoid interruption of traffic on such railway, as is highly desirable in many instances.

The main structural member of the apparatus is a hollow metal core 1 which forms a part of a casing and may conveniently be made of a section of wrought iron pipe. To the forward end of this is attached a tubular extension 2, also of metal, but preferably metal of non-magnetic character, as for example copper. Within such extension is placed a lining 3 of refractory material such as fire-clay hollowed out at its forward end to form a chamber 4 in conjunction with a reversely hollowed out opening in a disk 5 of carborundum or magnesite which closes the forward end of such extension, save for the reduced end of the opening in question.

This opening is closed by a relatively thin plate 7 of graphite, more or less firmly attached to the front face of the disk, such plate providing the contacting surface through which the heat developed by the apparatus in conveyed to the article to be welded, and which, due to its physical properties, diffuses or distributes very uniformly over its contacting surface the heat applied to the opposite face, as will be presently explained.

Substantially centrally mounted in the fire-clay lining 3 is a tubular graphite block 10 which forms a bearing within which an electrode 11 is slidably mounted. As shown, such electrode and the bore in this block are both preferably of rectangular cross-section, being wider in horizontal plane than in a vertical plane (see Fig. 2), and being thus elongated in the direction of the greater dimension of the area of the smaller article to be welded. The electrode is furthermore of such length that with its forward end substantially in contact with the inner face of the graphite plate 7, its rear end will project some distance beyond the fire-clay lining into the tubular chamber inclosed by the hollow core 1. Fixed to such rearwardly projecting end of the electrode is a rod 12 of copper or other adequate conductor, which projects entirely without the chamber in question, and is provided with a handle 13, or other suitable means, whereby the electrode may be moved toward and from the graphite plate, as will be readily understood.

Since the operator in using the apparatus, will, for the purpose of observation, most conveniently station himself at the other end of such apparatus, namely, at the right side thereof, as illustrated in Figs. 1 and 2, a second operating handle 14 on a longitudinally reciprocable bar 15 is provided, such bar being mounted in suitable brackets 16 on the side of the member 1 and having an arm 17 at its rear end rigidly connected with the rod 12, so that the latter, together with the electrode, may be reciprocated by operation of said handle 14 just as by the first-named handle 13.

When in use, the apparatus will preferably be supported in an inclined position, the forward face of the disk 5 and thus the plate 7 of graphite carried thereby, being inclined to the axis of the chamber, as indicated in Fig. 1, so that the latter will bear flat-wise against a vertical surface, with the apparatus in this inclined position. In order to thus support such apparatus, I pivotally attach a leg 20 of adjustable length to the rear end of the tubular casing 1, and at the other end thereof provide two forwardly extending arms 21, which are pivotally attached to the corresponding end of said casing at approximately diametrically opposed points 22 thereon. As best shown in Fig. 2, the ends of the arms, thus pivotally attached, are also rigidly connected by means of a yoke 23 of semi-circular form, which extends around the casing to a corresponding extent. Near the forward end of the extension 2 of such casing, is mounted a bracket 24 in which is in turn mounted a longitudinally disposed spindle 25, which is held against longitudinal movement while freely rotatable by means of the handwheel 26 on its forward end. The other end of this spindle is threaded into a nut 27 which has a swivel connection with the aforesaid yoke, as a result of which, rotation of the hand-wheel will obviously be effective simultaneously to swing both arms 21 in a vertical plane.

As illustrated in Fig. 1, these arms are designed to rest on top of the rail A being binded, and by thus adjusting them about their common pivotal axis, the forward end of the apparatus, in other words the graphite plate 7, may be brought to the proper elevation to contact with the outer face of the bond terminal B as shown in said figure, the pivotal leg 20 at the rear end of the apparatus being lengthened or shortened to present such graphite plate at the proper angle, which will ordinarily be in a vertical direction, except perhaps on a curve where the rail may incline somewhat. For rapid operation I ordinarily interpose between the bond and the rail A a thin strip of suitable metal, such as brass, to serve as a flux and assist in the uniting of the bond and the rail.

Moreover, by suitably inclining such rear support, the horizontal component of the thrust of the apparatus will ordinarily maintain the graphite plate under the proper pressure against the bond to serve the purpose in hand, although such pressure may be increased by positive mechanical means, (not ilustrated), as need not be explained.

The extremities of the two arms 21 are desirably provided with handles 28, which may be seized by the one operator, while another may take handles 29 attached on either side of the rear end of the casing and thus between them readily carry the apparatus from one point to another. The pivotal leg 20 will, in such case, be swung up under the casing, where it may be secured parallel therewith by a suitable clip 30 or like device.

The metal casing or core 1 forming, as before described, the main structural element of the apparatus, has its lateral walls, that is its vertical sides, considerably thicker than its top and bottom walls, as indicated by the end elevation in Fig. 3. Such increased thickness may conveniently be secured by attaching to the corresponding sides of the pipe section, previously referred to as constituting the case proper, two segmental plates 35 of steel or equivalent magnetic material, having functionally the same capacity to affect the magnetic field, which is produced by a coil 36 wound in the form of a helix around the outside of said casing, preferably from one end to the other, as best shown in Figs. 1 and 4. As illustrated, but a single helix is ordinarily necessary, although this may be varied where a different character of current is to be used, and where other conditions are changed. It will be observed that the axis of this coil is parallel with the electrode 11 and that such coil lies wholly to the rear, and that some distance to the rear of the forward end of the electrode between which and the inner face of the flat graphite plate 7 is formed the welding arc, which is relied upon in producing the desired temperature in such plate. Obviously the coil may be given other positions and forms if desired, to secure this same arc spreading effect.

The coil is preferably included in series with said electrode, the arrangement of the circuit 37, where a single apparatus is being used, being diagrammatically shown in Fig. 5, where the return, it will be observed, is through the rail A to the generator 38, which is illustrated as of D. C. type. A suitable switch 39 will of course be included in the circuit at a point convenient to the apparatus, as also a resistance 40 of any suitable construction, whereby the voltage may be brought down and regulated.

Where a suitable voltage is available, and it is desired, two apparatuses, substantially identical with the one just described, may be connected in series, as shown in Fig. 6. A motor generator 41, however, may be used in this case to provide, in effect, an independent source of current, although the rail A serves as the connection between the graphite plates 7 of the two apparatuses, and thus completes the circuit 42. A switch 43, as before, controls the latter, but the regulation of the voltage may be secured by suitable regulation of the generator. When two such apparatuses are used, it will be seen that in one the carbon plate is the positive electrode and in the other the negative. The effect of the present arc, however, is to give this carbon plate substantially the same temperature in both cases, which is not the case in the ordinary arc.

In utilizing the foregoing described apparatus, the same is supported, as hereinbefore described, so as to bring the outer face of the graphite plate in proper contactual relation with the bond terminal, pressing against the same with sufficient force to hold the latter in turn in proper contact with the juxtaposed face of the rail. The electrode is brought into contact with the inner face of such plate, and the circuit thereupon closed. As soon as the current is properly flowing, such electrode is slightly withdrawn by either pulling back on handle 13 or pushing on the other handle, so as to establish an arc between the forward end of said electrode and the inner face of the plate.

The heat generated by the arc in the chamber formed by the walls of the apparatus which tightly inclose the arc, brings the air and other gases within quickly to a high temperature, and renders them a conducting medium through which the current flows under the influence of the magnetic field of the apparatus, not in the form of a pencil as occurs in an ordinary arc, but as a solid column of flame of high intensity and remarkable uniformity of temperature. This column of flame flows to the graphite plate through which the bond is to be heated and is very uniformly diffused by said plate over its entire area on the side contacting with the one of the metals to be welded.

The length of the arc may be varied by the operator by moving the electrode, and such variation, it is found, is a means of controlling and limiting the temperature of the graphite plate and consequently of the terminal which is being welded. A long arc reduces the intensity of the heat at the graphite plate, while it increases the total amount of heat within the furnace and the uniformity of its distribution over the graphite plate. By varying both the length of the arc and the amount of current supplied, the operator has perfect control of the rate of heating of the bond terminal.

On account of the low amperage the heating due to resistance is a very small part of the total, main reliance being placed upon the effect of the arc which plays on the inner face of the plate and quickly brings the entire portion of such plate that is defined by the opening, to a very high temperature. In fact, such plate can be readily brought to a temperature higher than can be used in a bonding operation, and the electrode and current consumption must be regulated in some manner so as to keep such temperature down to a point where the heat from the electrode may be conducted through the terminal to the juxtaposed face of the rail, and have time to bring the latter to a temperature sufficient to secure a proper weld or braze without the bond terminal being melted down. Such melting would change the physical properties of the copper in a manner not desired in this process as applied to the bonding of rails. The means provided, however, are so conveniently at hand, that the operator stationed where he can observe the bond, may effect such regulation with extreme nicety.

The current, of course, in passing through the coil produces a magnetic field, the lines of force of which begin to spread or diverge rather sharply at the point where the arc is established.

In the actual utilization of the foregoing method and apparatus in rail bonding, it has been found that a current consumption of 60 amperes is sufficient to weld a two-inch terminal to the head of a rail, the voltage varying from 125 volts at the start of the operation, to 75 volts after the gases have become heated and the arc has been shortened to about a quarter of an inch to secure the greatest intensity of heat at the graphite plate.

Where a single apparatus is used as illustrated in Fig. 5, the line voltage being 600 volts, a drop in voltage between the line and that of the apparatus in operation must be secured. This may be obtained by resistance units, indicated in the figure, and of course there is a corresponding waste. This waste may be obviated by using, instead of resistance units to effect the necessary drop in voltage, a portable motor-generator set in the case of direct current, which may be stationed along the line of operation, which apparatus as is well known will transform a small direct current to high voltage into a larger current of lesser voltage. In case of alternating current the well known transformer suitable for this current would be used.

The apparatus in the form illustrated is extremely light and compact and yet capable of performing as indicated just as effectively and even more quickly than apparatus heretofore available for the use in question. Owing to the lower amperage of the current employed, it is not necessary to have as heavy a conductor for the leads to the apparatus as where a transformer is utilized to bring the current down to a very low voltage, such as is required with a high resistance heating electrode, so that even where a motor generator is employed as illustrated in connection with the double arrangement, and as might be desirable in connection with the single unit, such motor generator may be disposed to one side of the line of rails and only need be moved occasionally as the current can be carried therefrom to a considerable distance by means of flexible conductors, insulated in the ordinary fashion.

In conclusion it should be noted that in general I herein refer to the juxtaposed or contiguous faces of the bond and rail at the desired point of union as the contacting faces. This is simply for uniformity in expression, and does not of necessity imply that the faces in question are literally in contact, especially not at the beginning of the operation nor where a sheet of brass or braze is interposed, as may be the case, irrespective of which of the two arrangements of electric circuit for carrying out the process be adopted. Where such brass or braze is employed, it will hence be understood, unless expressly stated to the contrary, to constitute in effect a part of the bond, being preferably more or less permanently secured thereto, as in the case of the bond hereinbefore described. In case the brass is not so attached, it will ordinarily be fed between the contacting faces of the two bodies being joined, while the operation is in progress.

While the preferred form of apparatus, whether the heating agency employed be a gas flame or an electric arc, as hereinbefore described, will comprise both an inclosing chamber for such agency and a heat-distributing plate disposed across the opening in the chamber wall, through which the heat from within is directed onto the body to be welded, I have found that either such chamber or said plate may be omitted, and the process still carried on successfully, although not as satisfactorily as with the complete combination of parts.

Other modes of applying the principle of my invention may be employed instead of the one explained, change being made as regards the means and the steps herein disclosed, provided those stated by any of the following claims or their equivalents be employed.

I therefore particularly point out and distinctly claim as my invention:—

1. In a method of uniting contacting metal bodies, the steps which consist in pressing a heat distributing shield against the exposed face of one of such bodies, and then directing an external heating medium against the face of such shield opposite to that face in contact with such metal body.

2. In a method of uniting contacting metal bodies, the steps which consist in holding a heat distributing shield under pressure against the exposed face of one of such bodies, directing an external heating medium against the face of such shield opposite to that face in contact with such metal body, and spreading such medium over the major portion of the same.

3. In a method of uniting contacting metal bodies, the steps which consist in pressing a heat distributing shield against the exposed face of one of such bodies, the pressure being transmitted through such body to the surfaces to be united, and then directing an external heating medium against the face of such shield opposite to that face in contact with such metal body.

4. In a method of uniting contacting metal bodies, the steps which consist in pressing a heat distributing shield against the exposed face of one of such bodies, the pressure being transmitted through such body to the surfaces to be united, directing an external heating medium against the face of such shield opposite to that face in contact with such metal body, and spreading such medium over the major portion of the same.

5. In a method of uniting contacting metal bodies, the steps which consist in holding a heat distributing shield under pressure against the exposed face of one of such bodies, directing an electric arc centrally against such shield, and spreading the same over the major portion of the same.

6. In a method of uniting contacting metal bodies of unlike masses, the steps which consist in pressing a heat distributing shield of greater area than the exposed face of the body of smaller mass against such face of the same, and then directing an electric arc against such shield.

7. In a method of uniting contacting metal bodies of unlike masses, the steps which consist in pressing a heat distributing plate of greater area than the exposed face of the body of smaller mass against such face of the same, directing an electric arc centrally against such shield, and spreading the same over an area on such shield greater than the area of the face of the body of smaller mass contacted thereby.

8. In a method of homogeneously uniting a copper bond to a rail, the steps which consist in interposing a brass strip therebetween, pressing an infusible shield of greater area than the terminal of such bond against the exposed face of the latter, and then directing an external heating medium against such shield.

9. In a method of homogeneously uniting a copper bond to a rail, the steps which consist in interposing a brass strip therebetween, pressing an infusible shield of greater area than the terminal of such bond against the exposed face of the latter, directing an external heating medium centrally against such shield, and then spreading such flame over a greater area on said shield than the area of such bond terminal.

10. In a method of homogeneously uniting a copper bond to a rail, the steps which consist in interposing a brass strip therebetween, pressing an infusible shield of greater area than the terminal of such bond against the exposed face of the latter, directing an external heating medium, against such shield, laterally inclosing such medium and spreading the same over the major portion of such shield.

11. In a method of homogeneously uniting two bonds to a rail simultaneously, the steps which consist in placing a heat distributing plate against the exposed face of each bond terminal, directing an arc against one of such plates, conducting the current from such arc through that bond and along the rail to such other bond and plate, and then causing the current to arc from such last-mentioned plate.

12. In a method of homogeneously uniting two bonds to a rail simultaneously, the steps which consist in placing a heat distributing plate against the exposed face of each bond terminal, directing an arc against one of such plates, conducting the current from such arc through such bond and along the rail to such other bond and plate, causing the current to arc from such last-mentioned plate, and inclosing both of such arcs.

13. In a method of homogeneously uniting two bonds to a rail simultaneously, the steps which consist in placing a heat distributing plate against the exposed face of each bond terminal, directing an arc against one of such plates, conducting the current from such arc through that bond and along the rail to such other bond and plate, causing the current to arc from such last-mentioned plate, inclosing both of such arcs, and spreading the same.

14. In welding mechanism, the combination of a chamber having an opening in one side and otherwise inclosed by refractory, heat-insulating walls; a heat-distributing plate covering such opening, and adapted to contact with the article to be welded; means for pressing said plate against the article, and means within such chamber for applying heat to the interior face of such plate opposite to the face adapted to contact the body to be welded.

15. In welding mechanism, the combination of a chamber having an opening in one side and otherwise inclosed by refractory, heat-insulating walls; a heat-distributing plate covering such opening, and adapted to contact with the article to be welded; and means within said chamber for directing an electric arc against such plate.

16. In welding mechanism, the combination of a chamber having an opening in one side and otherwise inclosed by refractory, heat-insulating walls; a heat-distributing plate covering such opening, and adapted to contact with the article to be welded; and means within said chamber, including an electrode movable toward and from such plate, for directing an electric arc against the same.

17. In welding mechanism, the combination of a chamber having an opening in one side and otherwise inclosed by refractory, heat-insulating walls; a heat-distributing plate covering such opening, and adapted to contact with the article to be welded; means within said chamber, including an electrode movable toward and from such plate, for directing an electric arc against the same; and means adapted to spread such arc over the surface of such plate.

18. In a welding machine, the combination of a casing having therein a heating chamber provided with a heat distributing plate in one side for contacting one of the articles to be welded, means for directing an arc against such plate, and electro-magnetic means for spreading such arc over the surface of such plate, said means including a coil mounted concentric with such electrode but to the rear of such chamber.

19. In a welding machine, the combination of a casing having therein a heating chamber provided with a heat distributing plate in one side for contacting one of the articles to be welded, means for directing an arc against such plate, and electro-magnetic means for spreading such arc over the surface of such plate, said means including a coil mounted to produce diverging lines of force across the path of such arc.

20. In a welding machine, the combination of a casing having therein a heating chamber provided with a heat distributing plate in one side for contacting one of the articles to be welded, means for directing an arc against such plate, and electro-magnetic means for spreading such arc over the surface of such plate, said means including a core and a coil thereabout constructed to spread such arc over the entire surface of such plate.

21. In a welding machine, the combination of a casing having therein a closed heating chamber provided with an infusible heat distributing plate at one end, means for directing an arc within such chamber against such plate, said means including an electrode movably mounted in said casing and extending into such chamber, and also protruding from said casing, a handle extending laterally from such protruding end of such electrode, a rod attached to said handle and extending to the other end of said casing and a second handle attached to said rod at the last named end of said casing.

22. In a machine for welding a bond to a rail, the combination of a casing having a heating chamber in one end, said casing being adapted to be placed in an inclined position with the heating chamber thrusting against the bond, arms attached to said casing and supporting the same upon the rail, and a pivoted support on the other end of said casing for maintaining said casing in said position.

23. In a welding machine, the combination of a casing of elliptical cross-section and of magnetizable material, said casing being provided with an extension at one end containing a chamber therein and having a plate in its outer side, means for directing an arc within such casing against such plate, and a coil disposed about said casing and constituting therewith an electro-magnet for spreading such arc over the surface of such plate.

24. In a welding machine, the combination of a casing of elliptical cross-section and of magnetizable material, said casing being provided with an extension at one end, such extension being of unmagnetizable material and having a closed chamber therein with a plate in its outer side, means for directing an arc within such chamber against such plate, and a coil disposed about said casing and constituting therewith an electromagnet for spreading such arc over the surface of such plate.

25. In a welding machine, the combination of a hollow core having the bulk of the metal therein disposed at opposite sides and the core being of the same general form as the area of the article to be welded, a coil disposed about said core and constituting therewith an arc in a position to be spread by the lines of force produced by such electro-magnet.

Signed by me, this 9th day of June, 1915.

CHARLES A. CADWELL.

Attested by—
H. B. FAY,
THOS. H. FAY.